Aug. 10, 1937.                G. M. MAGRUM                2,089,656
                         HYDRAULIC SHOCK ABSORBER
                          Filed Sept. 25, 1936
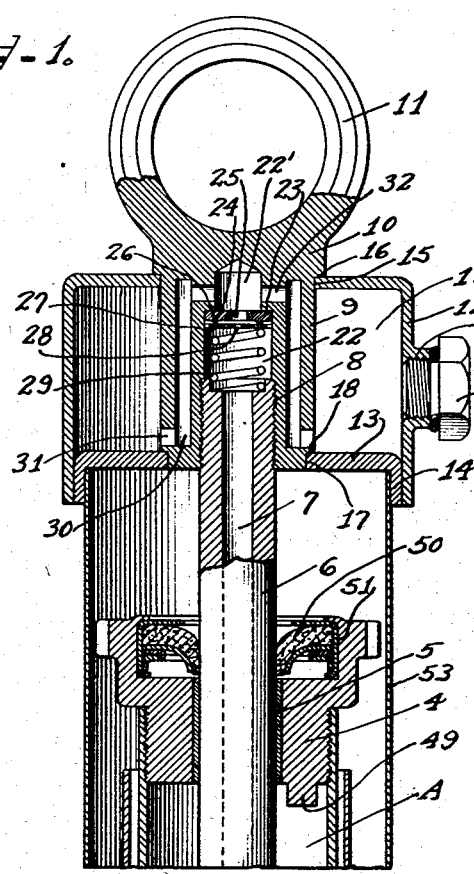
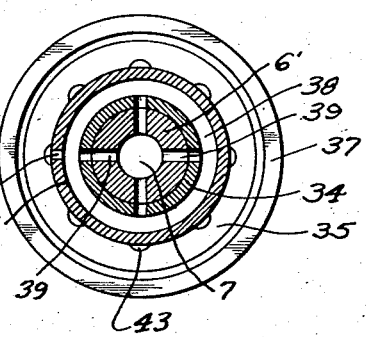
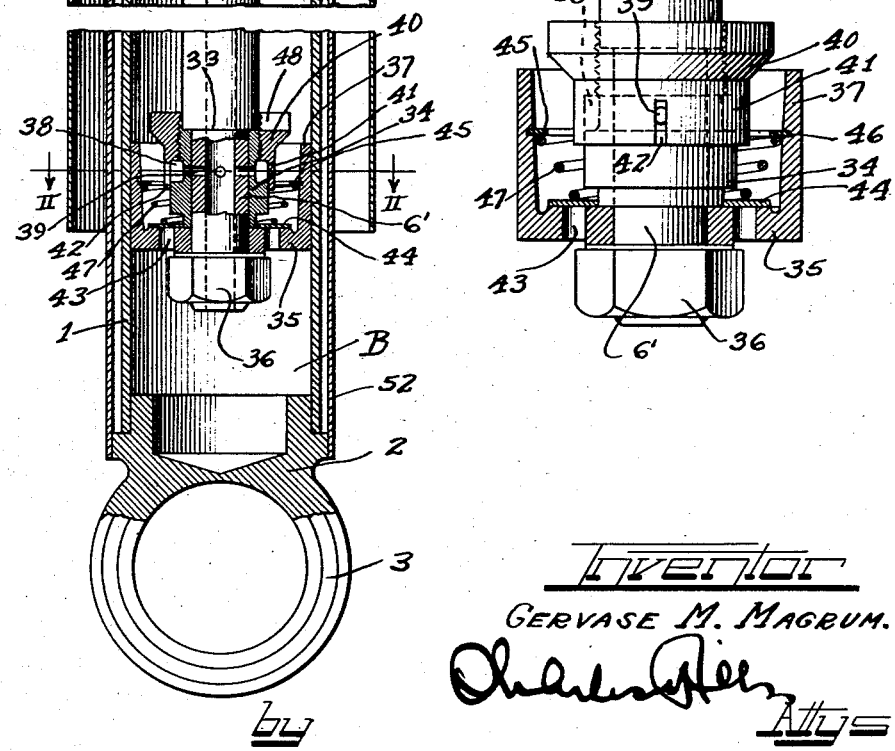
Inventor
GERVASE M. MAGRUM.

Patented Aug. 10, 1937

2,089,656

UNITED STATES PATENT OFFICE 2,089,656

HYDRAULIC SHOCK ABSORBER

Gervase M. Magrum, Buffalo, N. Y., assignor to Houde Engineering Corporation, Buffalo, N. Y., a corporation of New York Application September 25, 1936, Serial No. 102,523

10 Claims. (Cl. 188—88)

My invention relates to hydraulic shock absorbers particularly of the direct acting type for use on automotive vehicles.

An important object of the invention is to provide an improved shock absorber structure of this type in which the fluid reservoir is mounted on the outer end of the piston rod which is tubular or hollow, with valving means at the outer end of the piston rod for controlling fluid flow between the reservoir and the cylinder during operation of the shock absorber.

A further object is to provide improved valving structure on the piston for metering and controlling the flow from one side of the piston to the other during operation of the shock absorber.

A further object is to provide simple and efficient means for adjusting the piston flow valve structure without need of disassembling the shock absorber.

The various features of the invention are shown incorporated in the structure disclosed on the drawing, in which drawing, Figure 1 is a diametral section of the shock absorber;

Figure 2 is an enlarged section through the piston structure on plane II—II, Figure 1; and Figure 3 is a side elevation of the lower end of the piston and piston rod structure with the piston head in diametral section.

The structure shown comprises a tube 1 forming the cylinder which is closed at its lower end by a head 2 rigidly secured thereto, this head having an eye or loop 3 for cooperation with suitable fittings for securing the structure to a support such as the axle of an automotive vehicle. At its outer end the cylinder is closed by a head 4 which preferably has threaded engagement in the cylinder tube. This head has a bore for the bearing bushing 5 through which extends the piston rod 6 which has the bore 7 extending full length therethrough. At its outer end the piston rod is secured, preferably by threading, in the lower end of the bore 8 of the cylindrical body 9 of the fitting 10 which has the eye 11 for connection by suitable means, as with the chassis of an automotive vehicle.

The reservoir structure comprises the inverted cup shaped part 12 and the bottom wall 13, the bottom wall preferably having the depending flange 14 to which the lower end of the part 12 is secured as by welding. The upper part of the cup wall 12 has the opening 15 for receiving the body part 9 and abuts the shoulder 16 on the fitting 10. The bottom wall 13 has the openings 17 to receive the lower end of the body 9 and abuts the shoulder 18, these walls being secured to the body 9 as by being press fitted thereto, by brazing, welding, or otherwise, the wall parts 12 and 13 with the body part 9 of the fitting defining the annular reservoir chamber 19 around the body part 9, a filler opening 20 being provided for the reservoir normally closed by a plug 21.

The intermediate part of the bore 8 provides a valve chamber 22 and the outer end 22' of the bore is of reduced diameter to provide an internal shoulder 23 in the valve chamber for a valve seat plate 24 which is securely held against the shoulder. The seat plate has the axial port 25 therethrough and on the under side of the plate is the seating ridge 26 around the port for the valve 27 which, as shown, is in the form of a thin metal disc having the restricted orifice 28 therethrough in alignment with the port 25. A spring 29 abuts against the under side of the valve disc and against the outer end of the piston rod 6 and tends to hold the valve disc seated.

The fitting body 9 has one or more longitudinally extending passages 30 therethrough connected at their lower ends by passages 31 with the lower part of the reservoir, and connected at their upper ends by passages 32 with the bore end space 22' above the valve seat plate.

The inner end 6' of the piston rod is of reduced diameter to provide a shoulder 33 for the sleeve 34, the head 35 of the piston structure engaging the reduced end below the sleeve and a nut 36 clamps the piston head and sleeve securely on the reduced end 6', the piston head having the skirt 37 engaging with the cylinder wall.

Above the piston head the sleeve 34 has the annular external channel 38 connected with the piston rod bore by one or more passages 39 extending through the sleeve and the rod wall. Above the channel 38 the sleeve is threaded to receive the annular valve member 40, the valve member having the annular flange 41 depending therefrom across the channel and engaging the sleeve 34 below the channel. The valve flange has an orifice slit 42 therethrough for extending across the channel. This orifice meters the flow of the hydraulic fluid from one side of the piston to the other when the piston moves outwardly in the cylinder.

The piston head 35 has one or more ports 43 therethrough which ports are controlled by an annular valve disc 44 guided by the lower end of the sleeve 34. An abutment ring 45 is held in the annular groove 46 in the piston skirt 37, this ring forming the abutment for one end of the spring 47 which abuts at its other end against the valve 44 and tends to hold this valve in normal position to close the ports 43.

The piston divides the cylinder space into outer and inner hydraulic working chambers A and B and, where the shock absorber is connected between the chassis and axle of an automotive vehicle for controlling the vehicle spring, the piston will move inwardly in the cylinder during compression movement of the spring and will move outwardly during rebound movement of the spring. When the piston is moved inwardly during compression movement of the vehicle spring, the pressure of the fluid in the inner working chamber B will force the valve 44 from its seat for comparatively free flow of the displaced fluid to the outer working chamber A. Owing to the volumetric differential on account of the displacement by the piston rod, the outer working chamber cannot receive all of fluid displaced from the inner chamber and part of the fluid will flow upwardly through the bore 7 of the piston rod and through the restricting orifice 28 in the valve 27 which will be kept seated by the fluid pressure, the flow through the orifice finding its way through passages 32, 30 and 31 into the bottom of the reservoir 19.

During rebound movement of the vehicle springs and outward movement of the piston structure, the pressure of the displaced fluid in the chamber A will seat the valve 44 for closure of the ports 43 and all the flow past the piston must be by way of the restricted orifice 42, the channel 38, passages 39, and the piston rod bore 7 to the chamber B. The formation of vacuum in the lower chamber B on account of the volumetric differential will be prevented by flow of fluid from the reservoir to the chamber B through the hollow piston rod, the valve 27 being unseated by the suction for comparatively free flow past the valve of fluid from the reservoir into the chamber B. This flow of fluid from the reservoir will keep the chambers at all times filled with hydraulic fluid.

Adjustment of the valve 40 for the desired exposure of the orifice slit 42 to the channel 38 for the desired shock absorber resistance can readily be made by rotating the valve 40 which is threaded on the sleeve 34, and such adjustment can be made before the shock absorber is entirely assembled. Provision is made for service adjustment of the valve after the shock absorber has been assembled. For this purpose, the valve is provided with a notch 48 in its upper end for receiving a tongue 49 on the lower end of the cylinder head 4 when the piston structure has been shifted its full distance outwardly. Then relative turning of the cylinder and piston structure will result in turning of the valve 48 on the rod and axial adjustment thereof on account of its threaded connection with the rod.

To prevent escape of any fluid which might leak past the bushing 5, suitable packing structure 50 is provided in the recess 51 in the head 4 and is intimately held around and against the piston rod above the bushing 4. Any fluid that may escape past the bushing 4 is then scraped off of the piston rod and during downward travel of the piston the suction will return this fluid back to the cylinder.

A shield 52 in the form of a tube may be secured at its lower end to the head 2 to extend upwardly and encircle the cylinder 1 to protect the cylinder against injury as by stones thrown up from the roadway. A dust shield in the form of a tube 53 may also be provided to surround the cylinder structure, and this tube may be readily secured by being inserted in the flange 14 on the reservoir housing and secured as by welding or any other suitable means.

I have shown practical and efficient embodiment of the various features of my invention but I do not desire to be limited to the exact construction, arrangement, and operation shown and described as changes in structure and operation are possible without departing from the scope of the invention.

I claim as follows:

1. In a hydraulic shock absorber of the direct acting type, a cylinder, a piston and a piston rod extending therefrom, said piston rod having a bore therethrough, a fluid reservoir mounted on the outer end of said piston rod, and valve mechanism at the outer end of the piston rod operable to resist the flow of fluid to the reservoir from the cylinder but to permit freer flow in the opposite direction.

2. A hydraulic shock absorber of the direct acting type comprising a cylinder, a piston and a piston rod extending therefrom through the outer end of the cylinder, said piston rod having a bore therethrough, a fluid reservoir mounted on the outer end of said piston rod, and valve means at the outer end of said piston rod arranged to resist flow of fluid from the inner end of said cylinder to said reservoir and to permit freer flow from the reservoir to the inner end of the cylinder.

3. A hydraulic shock absorber of the direct acting type comprising a cylinder, a piston for said cylinder and a piston rod extending therefrom, valve control passages for the flow of fluid from one side of the piston to the other as the piston reciprocates in said cylinder, a fluid reservoir carried by the outer end of said piston rod and a passageway through said piston rod connecting said reservoir with the inner end of said cylinder, and valve means for resisting fluid flow from the inner end of said cylinder through said piston rod and to the reservoir during inward movement of said piston and for permitting freer flow from the reservoir through the piston rod to the inner end of the cylinder during outward movement of the piston in the cylinder.

4. A hydraulic shock absorber of the direct acting type comprising a cylinder, a piston in said cylinder and a piston rod extending therefrom, valve means controlling the flow of displaced fluid from one side of the piston to the other during reciprocation of the piston by said rod, a fluid reservoir carried by the outer end of said piston rod, a fluid flow passageway between said reservoir and one end of said cylinder, and valve means resisting flow through said passageway during movement of said piston in one direction and for permitting freer flow through said passageway during movement of the piston in the opposite direction.

5. A hydraulic shock absorber of the direct acting type comprising a cylinder, a piston in said cylinder and a piston rod extending therefrom to the exterior of the cylinder, said rod having a passageway therethrough, valve means controlling the flow between opposite sides of the piston when the piston reciprocates, a fitting secured to the outer end of the piston rod, a structure mounted on said fitting and defining therewith a fluid reservoir, a valve chamber within said fitting interposed between the outer end of said piston rod passageway and said reservoir, and valve means within said valve chamber arranged to resist fluid flow from the inner end of the cylinder to the reservoir but to permit freer flow from the reservoir to the inner end of the cylinder.

6. A hydraulic shock absorber of the class described comprising a cylinder, a piston and a piston rod structure extending therefrom, said piston rod structure having a passageway therethrough connecting the cylinder at opposite sides of the piston, an annular channel on the piston rod structure communicating with the outer end of said passageway, an annular valve surrounding said channel and having an orifice slit crossing said channel and operative to determine the resistance to fluid flow through said passageway, said valve having threaded engagement with said piston rod structure whereby rotary movement thereof will serve to adjust the degree of exposure of said orifice slit to said channel.

7. A hydraulic shock absorber of the class described comprising a cylinder, a piston and a piston rod structure extending therefrom, said piston rod structure having a passageway therethrough connecting the cylinder at opposite sides of the piston, an annular channel on the piston rod structure communicating with the outer end of said passageway, an annular valve surrounding said channel and having an orifice slit crossing said channel and operative to determine the resistance to fluid flow through said passageway, said valve having threaded engagement with said piston rod structure whereby rotary movement thereof will serve to adjust the degree of exposure of said orifice slit to said channel, and means operable by relative turning of said cylinder and piston rod structure for adjusting said valve after assembly of the shock absorber.

8. A hydraulic shock absorber of the class described comprising a cylinder, a piston and a piston rod structure extending therefrom, means defining a passageway through said piston rod structure between the opposite sides of said piston for the flow of fluid when said piston is reciprocated, an annular channel on said piston rod structure communicating with said passageway, an annular valve mounted on said piston rod structure and having a flange extending across to close said channel, said flange having an orifice slit for determining the resistance to fluid flow through said passageway, said valve having threaded engagement with said piston rod structure whereby turning thereof will effect axial shift for adjustment of the degree of overlap of said orifice and said channel.

9. A hydraulic shock absorber of the class described comprising a cylinder, a piston and a piston rod structure extending therefrom, means defining a passageway through said piston rod structure between the opposite sides of said piston for the flow of fluid when said piston is reciprocated, an annular channel on said piston rod structure communicating with said passageway, an annular valve mounted on said piston rod structure and having a flange extending across to close said channel, said flange having an orifice slit for determining the resistance to fluid flow through said passageway, said valve having threaded engagement with said piston rod structure whereby turning thereof will effect axial shift for adjustment of the degree of overlap of said orifice and said channel, and cooperating means on said valve and one end of the cylinder structure operable upon relative turning of said cylinder structure and piston rod structure to effect turning of said valve and thereby adjustment of its orifice.

10. A hydraulic shock absorber of the class described comprising a cylinder, a piston and a piston rod structure extending therefrom, said piston rod structure having a passage therethrough connecting the cylinder at opposite sides of the piston, an annular channel on the piston rod structure communicating with the outer end of said passageway, an annular valve surrounding said channel and having a restricted orifice overlapping said channel to determine the resistance to fluid flow through said passageway, and means whereby rotary movement of said valve on said piston rod structure will effect axial movement thereof for adjustment of the degree of exposure of said orifice to said channel.

GERVASE M. MAGRUM.